May 7, 1963 C. B. STRANG ETAL 3,088,324
NON-GYROSCOPIC INERTIAL REFERENCE
Filed April 12. 1960 9 Sheets-Sheet 1
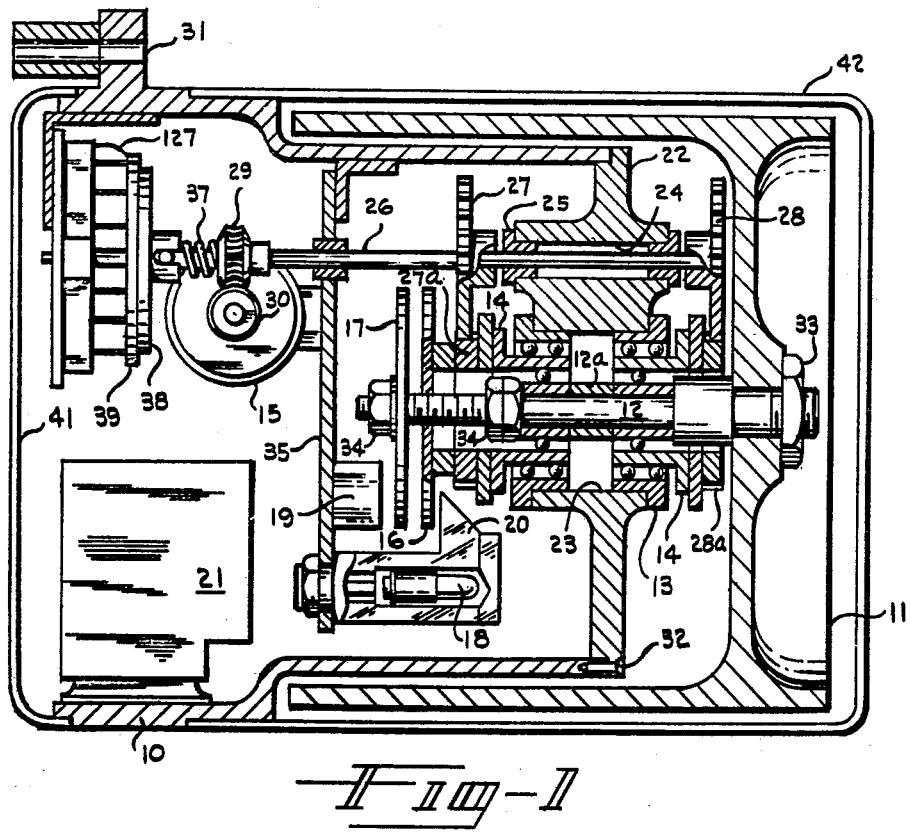
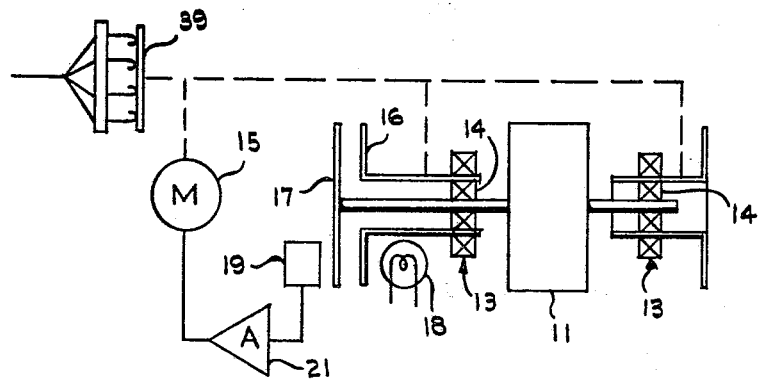
INVENTORS.
CLIFFORD B. STRANG
WILLIAM M. FURLOW, JR.
Julian C. Renfro
ATTORNEY

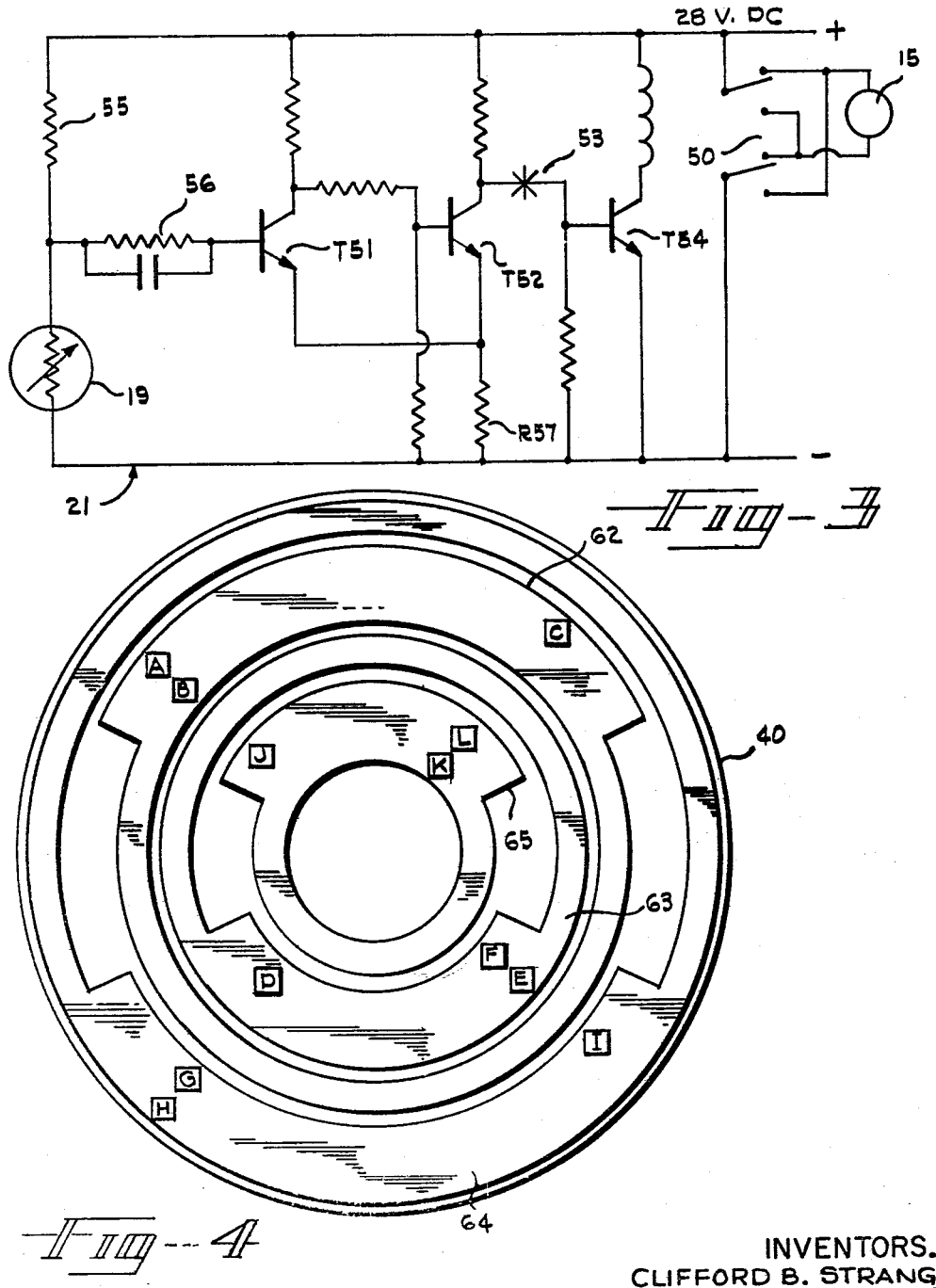

May 7, 1963
C. B. STRANG ETAL
3,088,324
NON-GYROSCOPIC INERTIAL REFERENCE
Filed April 12, 1960
9 Sheets-Sheet 3
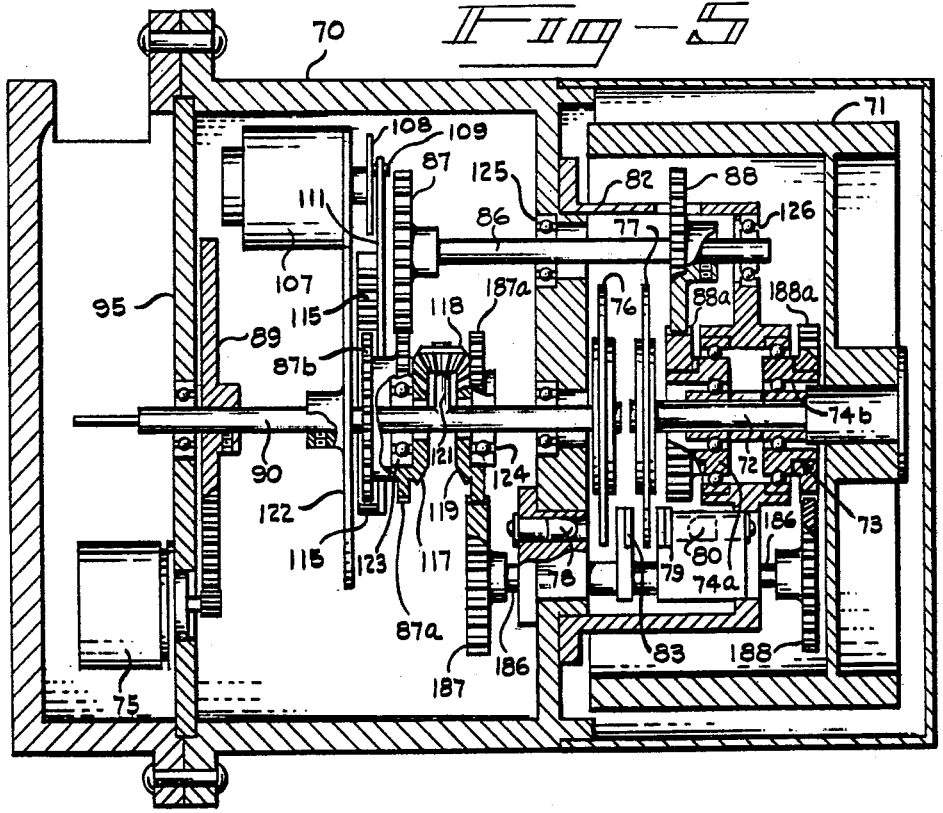
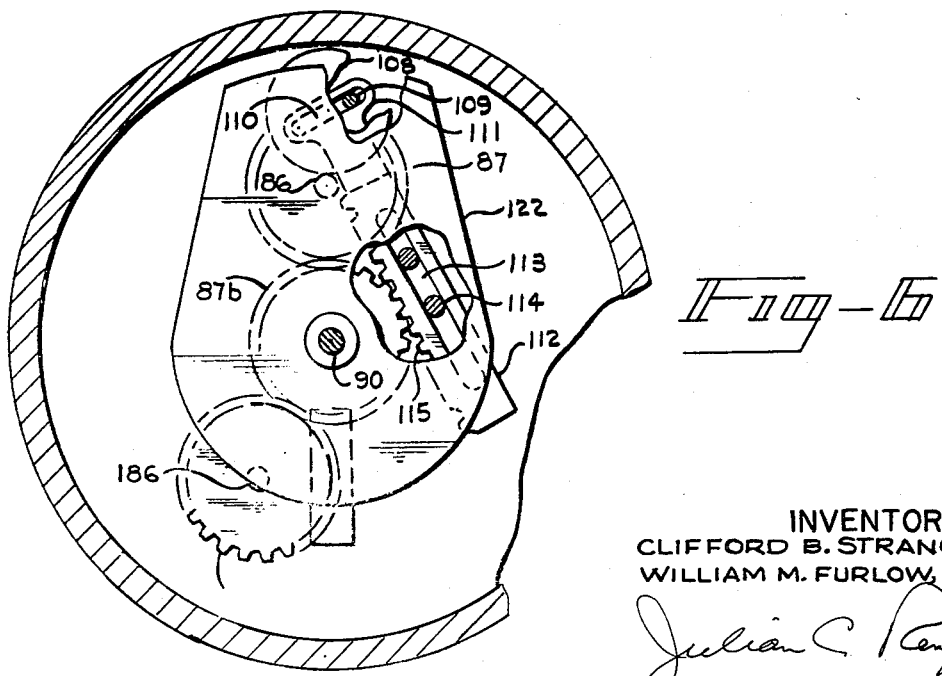
INVENTORS.
CLIFFORD B. STRANG
WILLIAM M. FURLOW, JR.
ATTORNEY May 7, 1963 C. B. STRANG ETAL 3,088,324
NON-GYROSCOPIC INERTIAL REFERENCE
Filed April 12, 1960 9 Sheets-Sheet 4
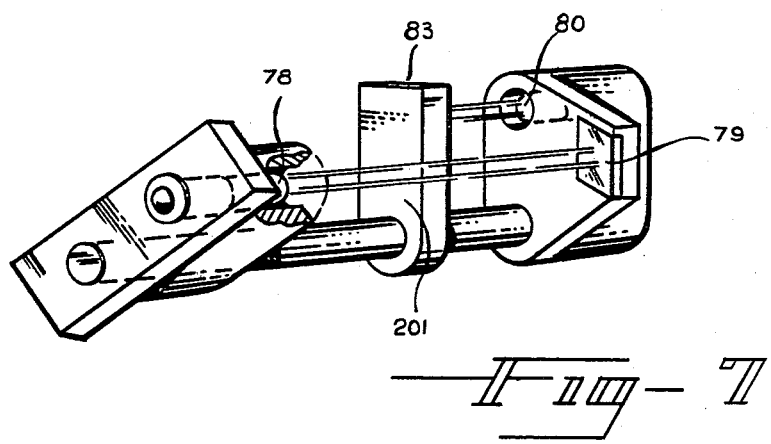
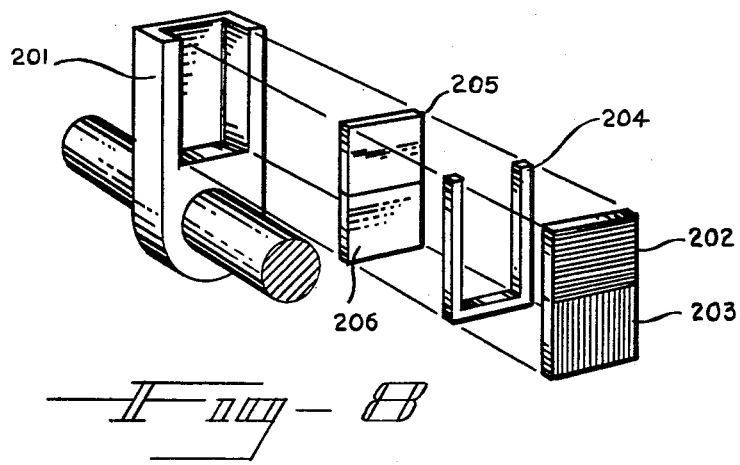
INVENTORS.
CLIFFORD B. STRANG
WILLIAM M. FURLOW, JR.
ATTORNEY

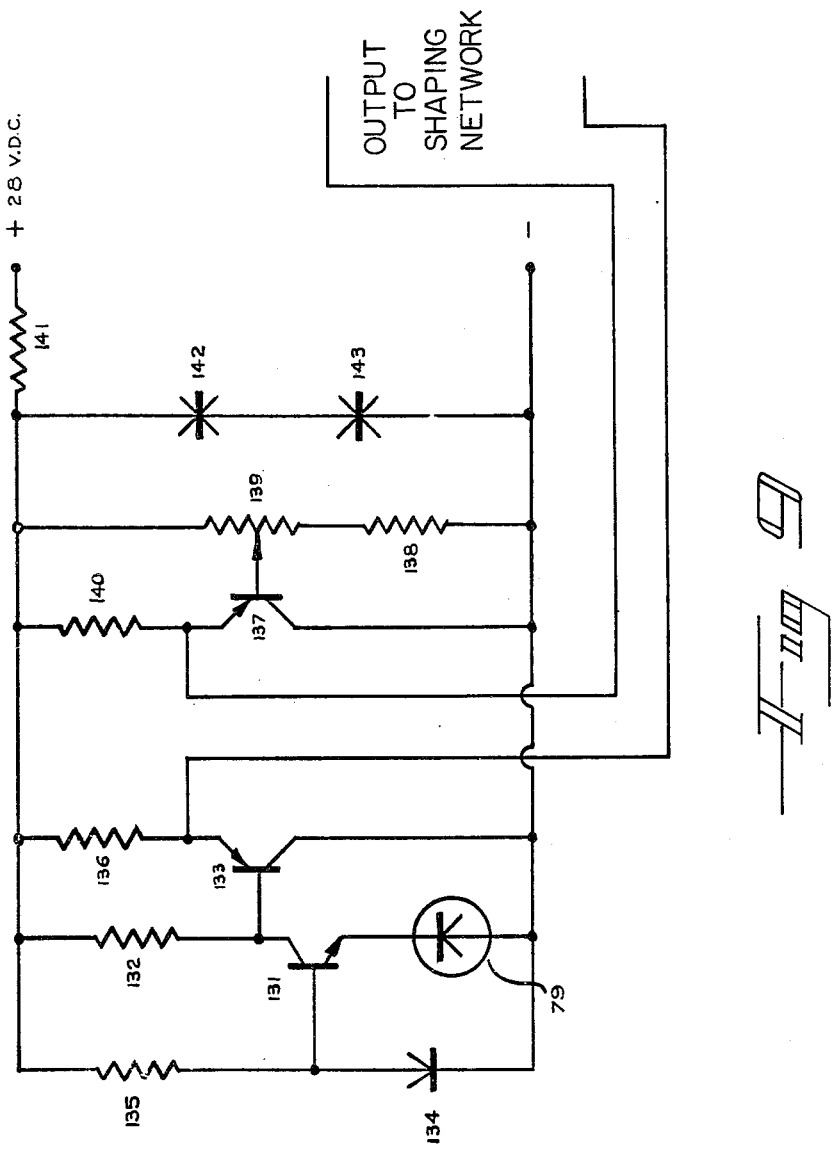

May 7, 1963  C. B. STRANG ETAL  3,088,324
NON-GYROSCOPIC INERTIAL REFERENCE
Filed April 12, 1960  9 Sheets-Sheet 9

INVENTORS.
CLIFFORD B. STRANG
WILLIAM M. FURLOW, JR.

ATTORNEY

United States Patent Office 3,088,324
Patented May 7, 1963

3,088,324
NON-GYROSCOPIC INERTIAL REFERENCE
Clifford B. Strang and William Meriwether Furlow, Jr., Orlando, Fla., assignors to Martin-Marietta Corporation, a corporation of Maryland
Filed Apr. 12, 1960, Ser. No. 21,748
12 Claims. (Cl. 73—505)

This invention relates to a non-gyroscopic inertial guidance arrangement for a missile, or the like, and more particularly to a precision device embodying a mass rotatably suspended so as to remain fixed in space despite movement of a missile about its roll, pitch or yaw axes, and arranged to supply directional information for missile guidance purposes. Each such device used on a missile is designed to sense movement about only a single axis, so in the event directional information is required for each axis, three such units would be utilized in such missile.

In the past, various attempts have been made to eliminate the need for gyroscopes for missile control, for gyros are not only complex and expensive but also their use entails special problems of design. By the use of the present invention, not only are the expensive gyro rotor and gimbal components made unnecessary, but also the substantial time required for gyro spinup can be eliminated, which means that a missile using the present non-gyro arrangement can be launched without the delay ordinarily required for spinup. However, prior art non-gyro systems have in all known instances been beset with perplexing problems such as the coupling torques produced by a suspension system.

According to the present invention, a static inertial mass is utilized, which is suspended in a unique suspension system that satisfactorily eliminates torque-producing external forces. In maintaining the disturbing torques at an extremely low level, the angular position of the inertial mass remains nearly stationary in space while the vehicle in which it is mounted is in motion thereabout, with the disturbing torques that tend to change the stationary condition of the inertial mass about its suspension axis being resisted by the inertia of the body.

The motion of the inertial mass as it deviates from its stationary position is a function of the magnitude of the disturbing torques and an inverse function of the mass moment of inertia. The total angle of drift $\theta$, or the angular movement of the inertial mass about the suspension axis is defined by the formula:

$$\theta = \frac{1}{2} \frac{Tt^2}{I}$$

where T represents the restraining torques, $t$ is the time during which the torques are exerted and I is the moment of inertia of the mass. Thus, small angles of drift can be realized from a suspension system that supports a mass having a relatively large moment of inertia on a low torque suspension, especially where the torsional restraints are present only for short durations of time.

The torsional restraints result from two conditions, coupling torque produced by the suspension system and unbalance torque of the inertial mass. Although recent advances in the development of precision bearings provide new vistas of performance, according to the present invention a three race bearing system is employed in which provision is made for driving and oscillating the middle race or races so as to appreciably reduce bearing friction. Coulomb friction is present when one or more balls of a ball bearing do not roll as a ball, such as perhaps due to the fact that flats have developed on the balls or their raceway. Coulomb friction includes static friction, which is a condition illustrated by the balls slipping instead of rolling. According to this invention, in order to compensate for coulomb friction, controlled oscillation is introduced into the middle race of the three race bearing.

The other significant friction involved is viscous friction, which is related to velocity, and for example occurs as lubrication is being pushed ahead of the balls as they roll through their raceway. According to this invention, a tracking arrangement is employed so that the middle race of the bearing "tracks" very closely the race of the bearing that is directly concerned with the support of the inertial mass so that latter race is not subjected to the effects of the rotation of the missile about the inertial mass. The tracking not only considerably reduces viscous friction, but also tends to reduce the coulomb friction caused by geometric errors of the balls and raceways.

As to the unbalanced torque of the inertial mass, the degree to which coincidence is required on the tolerance of the balance procedure is a function of the allowable drift rate of the inertial reference mass, and of the dynamic environment to which the mass is subjected. Since unbalanced torque is the product of the displacement of the mass center of gravity from its geometric center and the total mass of the inertial reference, torque increases and decreases with increasing and decreasing environmental g conditions. Dynamic balancing machines are available by the use of which the residual unbalanced torque can be reduced to a level which is an order of magnitude less than the frictional torque of the suspension system.

The configuration for the lowest torque-inertia ratio results in the selection of an inertial mass having the largest practical diameter with the weight concentrated at the periphery of the inertial mass. This is desirable because the moment of inertia of the mass varies as the square of its radius, and the less mass that must be supported by the bearing arrangement, the less the friction torque that must be contended with. For one missile application in which available space was at a minimum, there was a requirement that the missile roll reference maintain a drift rate of not greater than ten degrees in 30 seconds, with the size of the unit not to exceed 4 inches in diameter and 6 inches in length, and the total weight not to exceed 4 pounds. Keeping within these limits, the unit constructed according to this invention employed a rotatable inertial mass weighing approximately two pounds which had a moment of inertia of 27,700 gram-centimeters$^2$. Even in the preliminary tests of this unit in a missile, the launch attitude was preserved within 1% despite a steep angle of descent, which means that angle readout of up-down and left-right was of sufficiently high accuracy for guided missiles of short and medium range.

As previously mentioned, devices constructed according to the present invention may be utilized for furnishing angular reference information with regard to the roll, pitch or yaw axes of a missile. Each inertial reference device, of course, furnishes an indication of the angle through which the missile has moved about a certain axis, and by virtue of the present readout arrangement, this information is differentiated so as to represent angular rate. If desired, this information may be differentiated twice such as by the use of an RC network so that angular acceleration may be obtained in event such is required in the missile guidance arrangement.

The oscillation or dither for cancelling out the high level static friction that would otherwise be present in the bearing arrangement can be accomplished by the use of a high performance servo arrangement constructed to constantly seek a reference bias position; and since it has no dead band, this system is constantly in oscillation at a frequency determined by the amplifier and error detector gain, lead network and inertia and friction of the middle race drive. This oscillation should be uniform to prevent a resultant torque being created which would react upon the inertial mass to produce motion or drift, and in the event the bearing arrangement involves the use of a pair of three race bearings to support the inertial mass, the middle races may be dithered simultaneously in the same direction or may be dithered in opposite phase relation.

Because of the bearing arrangement being servo driven in such a manner as to "track" the race of the bearing that is in direct contact with the inertial mass, if the missile tends to roll clockwise, for example, the inertial mass concerned with roll information will tend to maintain its fixity in space, so that the missile in effect rolls about it. The middle race of the three race bearing in this instance is driven in the opposite rotative direction so that the inertial mass and the race of the bearing in contact therewith are oblivious to this rotation of the missile. The aforementioned oscillation of the middle race is superimposed upon this net rotative motion imparted to the middle race, so as a result the inertial mass can maintain its space stable attitude.

According to a first embodiment, only a single servo motor is employed for causing the dither and tracking of the middle race of the three race bearing, this servo motor being disposed in a servo loop arrangement that includes a pair of rotatably disposed, light-polarized discs. One of these discs rotates in concert with the middle race of the bearing arrangement whereas the other disc is secured to the inertial mass. A light source is arranged to project light through both discs, with the amount of light emanating through the discs being proportional to the $\cos^2$ of the angle between their respective axes of polarization. A photosensitive detector is arranged to be subjected to the light emanating through these discs with the resistance of this detector changing appreciably with a change in the amount of light falling thereon. This detector is disposed in a servo amplifier circuit in the nature of a Schmitt trigger which is adapted to change state or fire each time a significant change in the resistance of the photo-sensitive detector takes place. This circuit is arranged to move a double pole, double throw relay between two operating positions, with the servo motor being connected to rotate, for example in a clockwise direction when the relay is in a first position, and to rotate in the counter-clockwise direction upon the relay being moved to its opposite position, the servo motor in all instances operating at or near full speed.

Thus, it is to be seen that when the light-polarized disc associated with the three race bearing is being turned in a direction so as to increase light, for example, the resistance of the photo-sensitive detector decreases, causing the Schmitt trigger circuit to change state and move the relay in the direction to cause the servo motor to rotate in the opposite direction. Upon this taking place, the same disc is now driven in the direction to decrease light, which causes its resistance to increase, and, therefore, causing the Schmitt trigger circuit to change state and move the relay to the opposite position, causing the servo motor to rotate in the original direction. The arrangement is such that this oscillation is continuous, causing the middle race of the three race bearing to dither uniformly about a reference point at a desirable high frequency.

The other light-polarized disc, which is secured to rotate with the inertial mass, plays no part in this dithering, but it does serve as a reference point for light intensity as the missile rolls, for example, for in such instances the roll takes place with respect to the second disc, thereby causing the point about which the dither is occurring to change. More specifically, as the missile rolls in one direction, the second disc in effect turns in the opposite direction, to bring about the net rotation of the middle race in the opposite direction to the roll, so as to in effect isolate from missile rotation the race of the bearing associated with the inertial mass.

According to another embodiment of this invention, separate servo motors can be utilized for the dithering and tracking functions. A differential arrangement may be utilized so that the dither motion produced from the dither servo as well as the tracking motion produced from the other servo can be effectively combined and then delivered by appropriate gearing arrangements to the middle races of spaced three race bearings utilized to support the inertial mass. In such instance, both middle races would have a net rotation in the counter clockwise direction in the event the missile was rotating, say, in the clockwise direction, with the dither motion being superimposed upon this net rotation. Although the dither is most critical during the launch phase of the missile and the middle race tracking is most critical during any high rotation regime of the missile flight, it is usually preferable to operate both of these arrangements continuously from a time just before launch throughout the flight of the missile.

Different types of readout may be employed for different types of missile application provided the readout imposes no restraint on the inertial mass. For example, a synchro, commutator, or potentiometer readout can be employed as a function of a control system with which it is operating, with the changes and angles sensed by such an arrangement causing signals to be sent to the control system that is responsible for positioning the control surfaces in order for the missile to fly the desired course. As an alternative arrangement, an optical arrangement utilizing light-polarized discs such as of Polaroid material may be employed, or a coded-segmented disc may be utilized for reading out angular position information in a convenient form to be used for telemetry purposes, the latter being true because digital information is ideal to work with for such purpose.

As a result of the minimization of friction according to this invention, the inertial reference mass is enabled to maintain its stability in space very accurately and thereby serve to maintain a reference position. At launch the inertial reference mass is connected through a servo loop to the commutator arrangement of this invention, which can then maintain its position in space irrespective of missile gyrations, and thereby enable commands to the missile to be in the proper orientation. For example, in a non-gyro reference arrangement utilized for roll information, the inertial mass and the commutator remain space stable with the missile rolling about them. A number of brushes that rotate with the air frame of the missile are in contact with the commutator, with each brush corresponding to a certain control surface concerned with controlling the direction of flight of the missile. Because the commutator effectively serves as an orientation for missile commands, successive commands to each control surface will occur as the missile rotates, causing them to successively deflect each time they pass through a certain quadrant, thereby cooperating to bring about a net change in the direction of flight, even for a rolling missile, when such a change is desired.

Thus it is to be seen that the present non-gyroscopic inertial reference amounts to highly accurate device possessing a considerable number of advantages over a gyroscope arrangement, such as simplicity of design and the exemption from the need to be temperature stabilized to close tolerances. Also, activation time is practically instantaneous as compared with thirty seconds to two minutes required by a gyro to reach operating speed. Furthermore, the device according to the present invention can be uncaged and maintain its alignment inasmuch as it has no drift rate under static conditions, and because of this, it is ideal for use in missiles which must be mounted on launchers in "ready to fire" condition for long periods of time.

These and other objects, features and advantages of this invention will be apparent upon study of the accompanying drawings in which:

FIGURE 1 is a cross-sectional view of a first embodiment of a non-gyroscopic inertial reference device according to this invention, with certain portions removed for clarity;

FIGURE 2 is a simplified over-all view of a servo system according to this invention;

FIGURE 3 is a wiring diagram of a servo amplifier such as may be used in conjunction with the aforementioned first embodiment;

FIGURE 4 is a view of the commutator arrangement of the first embodiment to a somewhat larger scale, revealing detail of commutator bars and the relation of the brushes therewith;

FIGURE 5 is a cross-sectional view of a second embodiment, partly in section, which principally differs from the first embodiment in that the middle races of the three race bearing assembly are driven in opposite directions;

FIGURE 6 is an end view of the embodiment according to FIGURE 5, revealing details of a mechanical oscillation drive;

FIGURE 7 is an enlarged view of the photodetector arrangement of the embodiment according to FIGURE 5;

FIGURE 8 is an enlarged view showing a portion of the photodetector arrangement of FIGURE 7 in exploded relation;

FIGURE 9 is a circuit diagram illustrating a D.C. preamplifier and position bias amplifier utilized in the servo arrangement of the embodiment according to FIGURE 5;

Figure 10:
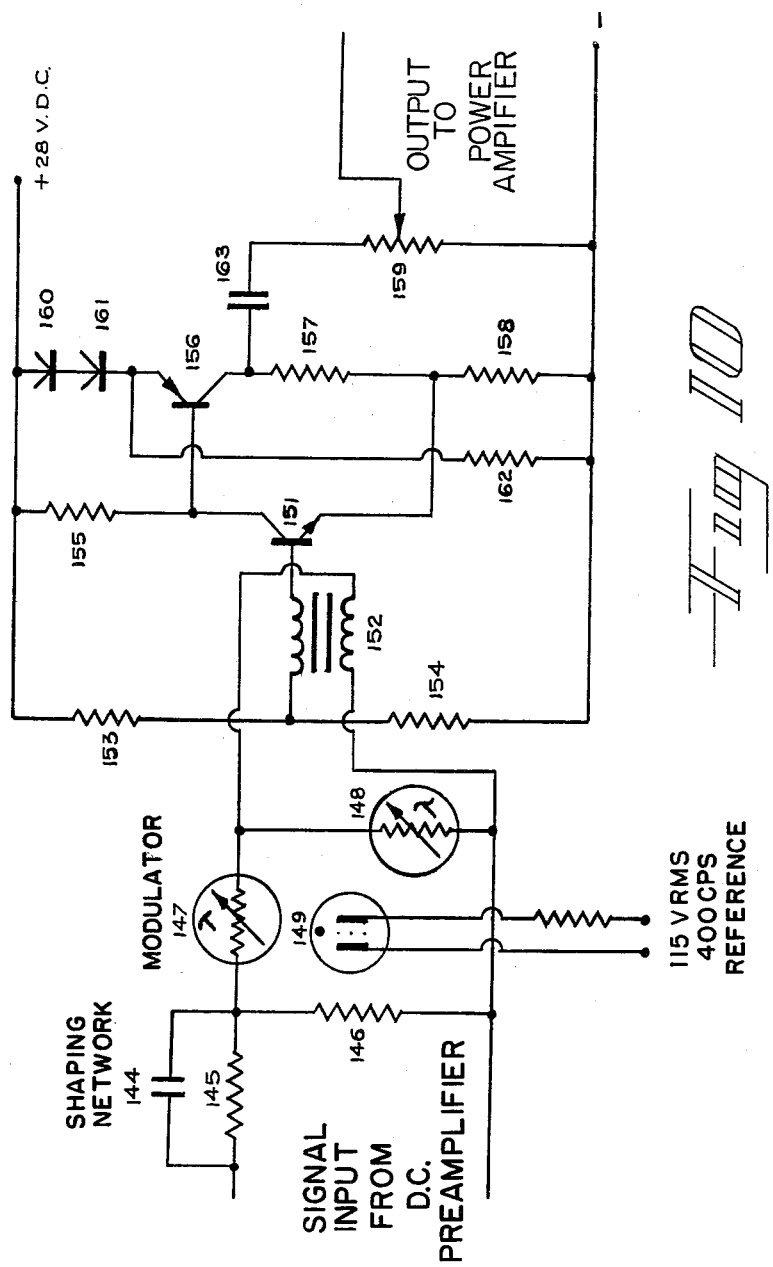
FIGURE 10 is a continuation of the circuit diagram of FIGURE 9, illustrating the modulator and A.C. preamplifier.

Turning now to the drawings, in FIGURE 1 a housing 10 is provided in which an inertial reference mass 11 is rotatably mounted so as to be able to remain fixed in space, despite the fact that a missile in which housing 10 is mounted is caused to roll or to undertake other gyrations during flight. Mass 11 is mounted upon a shaft 12 that is supported in a three race bearing arrangement 13, with the bearing arrangement in turn being supported from the housing. In this embodiment, the middle race or races 14 of the bearing arrangement are arranged to be driven by a driving means such as a servo motor 15 or the like, not only to provide oscillation to the middle races, but also to drive the middle races synchronously with the inertial mass to further reduce friction, these functions being accomplished in a manner to be described hereinafter.

The housing 10 may be of cast aluminum or the like, and equipped with a plurality of mounting holes 31 to enable it to be secured, for example to the frame of a missile by mounting bolts. Housing 10 is generally cylindrical and has mounted inside thereof a mounting plate 22, held in place such as by screws 32. Plate 22 is of sturdy construction and equipped with a centrally disposed mounting hole 23, as well as a smaller hole 24 essentially parallel to hole 23. Both holes are formed with enlarged edges or flanges, with hole 23 being arranged to receive the three race bearing assembly 13 associated with the support of inertial mass 11. Shaft 12 forming the support for mass 11 is tightly secured thereto by a nut 33 or the like. Although this invention comprehends the use of a single three race bearing ot support the shaft, it is usually preferable in the interests of stability to employ a pair of spaced three race bearings, placed in the general manner shown in FIGURE 1, to constitute the bearing assembly 13. The outermost race of the bearings of this embodiment are tightly received in hole 23, and held in place by virtue of a nut 34 screwed upon shaft 12, with a spacer 12a holding the inner races a proper distance apart.

In hole 24, shaft 26 involved in driving the middle races 14 is located, being supported by a sleeve bearing 25 located at each end of hole 24. Two gears 27 and 28 are affixed to shaft 26 in spaced relation, being in mesh with gears 27a and 28a affixed to respecitve middle races of the bearing assembly 13. Shaft 26 is driven in rotation by a worm wheel 29 mounted thereon, and worm 30 in mesh with worm wheel 29, is driven by servo motor 15 in a direction depending upon the energization thereof. Motor mounting plate 35 forms the support for motor 15, light 18, detector 19, and one end of rotatable shaft 26.

Upon the end of shaft 26, remote from gear 28, is located compression spring 37 which bears upon clutch plate 38 and biases it against commutator 39. The commutator arrangement will be described at length hereinafter and suffice it to say that the inertial mass serves to keep the commutator oriented in such a position in space that the up-down, left-right of the pilot, launching aircraft or ground station (as the case may be) will be preserved in such a manner that upon a command signal being sent to the missile, the missile can be relied upon to follow the desired trajectory. The clutch drive for the commutator 39 allows some relative motion to take place, which permits the servo system to become activated and for the middle race to seek the null position prior to launch. The servo system is energized a few milliseconds before launch and at launch the inertial mass, servo system and commutator are thus aligned and ready to read out the roll position to the control system of the missile.

So that the commutator 39 will be properly oriented, a "caging" arrangement is employed, comprising of a fine wire 127 anchoring the commutator to the missile frame reference position until launch. At that time, a current surge consumes the restraining wire, thus allowing the commutator to rotate in synchronism with the inertial mass. Accordingly, the launching aircraft may take violent maneuvering before launching the present missile, but inasmuch as the clutch arrangement enables the commutator to be uncaged so as to be aligned with the proper coordinates at the time of launch, the orientation of the missile need not be affected by pre-launch maneuvering. In this way, any restraining of the inertial mass itself is avoided which is, of course, quite desirable in that at the time the mass would have been uncaged, an angular momentum would have been imparted to it.

The servo system utilized according to this embodiment for providing dither and tracking preferably comprises two light-polarized discs rotatably disposed in spaced relation, a light source adapted to direct light through the discs, a photo-sensitive detector upon which the light impinges, a servo amplifier, and a servo motor, which may be a permanent magnet D.C. motor. Disc 16 of Polaroid or other light-polarized material is secured to middle race 14 and being rotatable therewith, and similar disc 17 is secured to shaft 12 to move relatedly with mass 11. A source of light 18 directed through a light pipe 20, such as of lucite, is utilized to provide illumination on one side of the two light-polarized discs with photo-sensitive detector 19 being employed on the opposite side of the discs from the light source, with the illumination transmitted through the discs being proportional to the cos² of the angle between their respective axes of polarization. Photo-sensitive detector 19 is an essential portion of the servo amplifier 21 illustrated generally in FIGURE 1 and in detail in FIGURE 3, and described at length with regard to latter figure. Suffice it to say that the relative positions of the discs determines the intensity of light received by the photo-detector 19, which is critically disposed in the servo amplifier circuit 21, and by its resistance controls the state thereof. This is turn causes the relay 50 to be positioned in one or the other of two positions. Note the relay and motor arrangement in FIGURE 3. Servo motor 15 in this embodiment is caused to be driven at full speed in one or the other of two directions, depending upon the position of relay 50, with rotation in one direction causing disc 16 to rotate so as to change the light value and bring about a movement of relay 50 to a position that corresponds to rotation of the servo motor in the opposite rotative direction. Each change in relay position causes the direction of the rotation of the servo motor to immediately reverse and this in turn causes the value of the light to change and hence the state of the circuit, thereby bringing about another reversal in the position of relay 50. This servo system has no dead band, and is constantly seeking the reference bias position, and, therefore, is in constant oscillation at a frequency determined by the amplifier 21 and related components.

Referring to FIGURE 2, a simplified view of the servo system utilized in the embodiment according to FIGURE 1 is set forth, with inertial mass 11 schematically illustrated to be supported by a three race bearing arrangement 13. Light-polarized disc 16 is disposed so as to be rotatable with the middle races 14, so as the middle races are driven by the gearing and shafting members from servo motor 15, the disc 16 is caused to rotate so as to change the amount of light being directed on photosensitive detector 19 from source of illumination 18, thereby bringing about motor reversal.

As previously mentioned, because photo-sensitive detector 19 is critically disposed in servo amplifier 21, it is caused to change its state frequently and thereby cause servo motor 15 to constantly operate at full speed in one or other of two directions. This, therefore, amounts to a servo loop which is constantly seeking the reference bias position, and the dither thus provided tends to minimize the static friction in the bearings that would otherwise tend to induce errors into the position of the intertial mass.

Although the light-polarized disc 17 is not as such a part of the servo loop, its position does affect the amount of light falling upon photo-sensitive detector 19, so as it moves as a result of the rotation of the inertial mass 11 (actually the mass does not rotate but rather the missile around it), this causes the reference point of the oscillation to change, and causes the motor 15 to drive the middle race portion of the bearing arrangement in a net rotative direction opposite to that of missile roll, for example, so as to eliminate the effect of roll on the bearing arrangement of the inertial mass concerned with roll information. FIGURE 2 also reveals that the servo motor 15 drives commutator disc 39 so as to provide an effective reference for roll information, so that command information can be properly utilized by the guidance system of the missile.

Referring to the servo amplifier illustrated in FIGURE 3, it will be seen that photodetector 19 is disposed in such a position that its resistance controls the signal current to the base of transistor 51, through lead network 56. Photodetector 19 may be of a type known as the Clairex CL3A manufactured by the Clairex Corporation of New York, N.Y. Servo amplifier 21 is, in effect, divisible into two separate sections with transistors T51 and T52 representing a regenerative switching amplifier, and the other section representing a transistor switch in which transistor T54 is employed, this transistor switch having a dead zone defined by the zener voltage of zener diode 53. Transistors T51 and T52 may be 2N336 transistors, whereas zener diode 53 may be a 1N429 diode and transistor T54, a 2N498 transistor.

The regenerative switching amplifier portion of the servo amplifier is known as a Schmitt-type trigger circuit, such as is illustrated in "Junction Transistor Electronics," by Richard B. Hurley (John Wiley and Sons, 1958, wherein on pages 412 and 413 such a circuit is shown and described.

As an example of the operation of this device, as the light from source 18 that is sensed by the photodetector 19 increases, its resistance decreases, with this causing collector current to decrease in T51 because of less voltage drop between the base and emitter of T51. This causes an increase of voltage to the base of T52, which increases the emitter current flowing through R57, thus causing an increased voltage drop across R57, this being in the direction of regenerative feed-back to the emitter of T51.

Assuming an initial condition of T51 in the full conduction state, T52 is caused to be reverse-biased, and as the current through T51 is caused to decrease, the voltage across T57 decreases, while the base voltage of T52 increases. At the point where the base to emitter voltage of T52 reaches roughly the intrinsic voltage of +.4 volt then T52 switches into full conduction, causing a larger voltage drop across R57, causing T51 to cease conduction.

When T52 switches on, its collector voltage drops, causing T54 to switch off, minimizing the current through the winding of relay 50. This causes the relay to drop out and because of its double pole, double throw construction, a circuit is closed which causes the servo motor 15 to be energized so as to rotate at full speed in a given direction. Relay 50 may be of a type R8001A8K manufactured by Iron Fireman Manufacturing Company of Portland, Oregon.

This rotation of motor 15 causes the middle races of the bearing assembly to be driven in rotation, thus causing light-polarized disc 16 to bring about a change in the light received by photodetector 19, the change now being in the direction of decreasing light, which causes the resistance of photodetector 19 to increase.

This increase in resistance takes place until the voltage across the photodetector is roughtly .4 volt greater than that across R57 at which time T51 begins to conduct. This lowers the voltage at the base of T52 which in turn decreases the current through R57. This lowers the voltage at the emitter of T51 to conduct more heavily. This regenerative action sends T51 into full conduction and T52 off.

The use of the zener diode 53 is optional in the circuit, but if used, when the collector voltage of T52 has increased to a value above the zener voltage, T54 becomes forward biased and switches on, causing current to flow through the winding of relay 50 and causing it to pull in and, therefore, causes the servo motor 15 to be energized to rotate in the opposite direction. Servo motor 15 may be of a type B–3A–998–12 manufactured by Globe Industries, Inc. of Dayton, Ohio.

In order for the inertial mass 11 to provide useful directional information, it is necessary that the mass be initially aligned, and from this position all directional information is referenced. As shown in FIGURE 1, commutator 39 is disposed upon shaft 26a so that it will be oriented at all times to provide a reference for left-right and up-down missile commands.

Referring to FIGURE 4, it will be seen that commutator 39 includes a non-conductive disc 40 upon which are disposed commutator bars 62, 63, 64 and 65. This commutator arrangement is ideal for roll information, with the commutator bars respectively representing the input up command, the input left command, the input down command, and the input right command. Each commutator bar is contacted by three brushes supported from a common brush holder, with commutator bar 62 being contacted by brushes A, B, and C; commutator bar 63 being contacted by brushes D, E, and F; commutator bar 64 being contacted by brushes G, H, and I; and commutator bar 65 being contacted by brushes J, K and L respectively, as shown symbolically in FIGURE 4. The placement of brushes B, E, H and K are such that they will be in contact with a portion of their respective commutator bar at all times through 360° movement, whereas the other brushes associated therewith are radially located so as to be moved off their respective bar onto the non-conducting surface of the commutator plate upon sufficient relative movement taking place between the housing 10 and the inertial mass 11. As will be noted from FIGURE 1, commutator 39 is mounted on the same shaft from which the middle races of the bearings are driven, so in effect, the commutator plate 40 is caused to rotate in synchronism with the movements of the inertial mass with respect to the housing. As already discussed, in reality the inertial mass remains fixed in space and the missile rolls thereabout, which means that commutator plate 40 will remain substantially in the position illustrated in FIGURE 4 in order that the control system of the missile will always know which direction is up. Inasmuch as the brushes contacting the commutator bars are mounted upon the housing in a non-rotative manner, as the missile is caused to roll about its own axis during flight, the brushes not arranged for 360° contact are caused to move from one commutator bar, through a non-conducting portion and hence to the other commutator bar located at the same radius. Since a control surface of the missile corresponds to a certain brush for left-right and another brush for up-down, by virtue of this commutator arrangement, the control surfaces of a missile are caused to deflect in a certain manner for a portion of each rotation of the missile in order to bring about a desired left-right or up-down change in flight direction.

As an example, if the pilot or guidance system calls upon the missile to move up, this signal is conducted to commutator bar 62 by brush B, which is in contact with bar 62 at all times. As the missile rolls, say clockwise as shown in FIGURE 4, brush C moves off bar 62, whereas brush G moves across a non-conducting space on commutator plate 40 and into contact with bar 62, inasmuch as all the brushes, as previously mentioned, undertake movement in accordance with missile roll. Because of this, the control surface corresponding to brush C is caused to move away from its position calling for upward flight, and does not again become positioned for calling for an upward turn by the missile until such time as it has moved past bar 64 and again comes into contact with bar 62, whereas the control surface corresponding to brush G begins deflecting as soon as G contacts bar 62 to bring the path of the missile upward. Therefore, by virtue of this arrangement, the control surfaces of the missile can consecutively undertake motions that bring about a desired direction of flight of the missile, despite the fact that the missile is continuously rolling.

Referring to FIGURE 5, an embodiment is shown in which a different type of arrangement is employed for minimizing friction in the bearing arrangement that is utilized for supporting the inertial mass. This embodiment employs an arrangement for counter-rotating the middle races of the pair of bearings employed for supporting the inertial mass. By virtue of this arrangement, it is possible to average out the frictional torque disturbances, leaving only an extremely small residual error remaining, which even lower than the error remaining in the embodiment according to FIGURE 1.

As seen in FIGURE 5, a housing 70 is illustrated in which inertial reference mass 71 is rotatably disposed, being mounted upon shaft 72 which is disposed in a three race bearing arrangement 73. Middle races 74a and 74b are driven in rotation, but in opposite directions at all times in order to minimize friction to the greatest extent possible.

A middle race oscillation drive motor 107 is provided for supplying uniform dither to middle races 74a and 74b by virtue of a gearing arrangement associated with shafts 86 and 186, disposed approximately 160° apart as is best seen in FIGURE 6.

Motor 107 is mounted upon a plate 122 which is secured by locking screws or the like to shaft 90 so as to be rotatable therewith. Motor 107 is arranged to drive in rotation a disc 108 having a short pin 109 projecting therefrom, and engaged in slot 110 disposed in one end of a Scotch yoke 111. Scotch yoke 111 has an elongated portion 112 equipped with an elongated slot 113 therein, with pins 114, mounted on plate 122 serving to define the position of the Scotch yoke so as to keep teeth 115 of the Scotch yoke in mesh with the teeth of a gear 87b that is centrally disposed about shaft 90, but not secured thereto. Motor 107 may be, for example, a shunt wound motor operating at practically constant speed in a single rotative direction, and as it drives disc 108 in rotation, offset pin 109 is moved back and forth in slot 110 so as to cause the Scotch yoke to undertake substantially rectilinear motion, thereby causing gear 87b to rotate in one direction as the Scotch yoke moves upwardly and in the opposite rotative direction when the Scotch yoke moves downwardly.

Gear 87b may be part of a compound gear as illustrated in FIGURE 5, in which gear 87a is located on a hub common also to gear 87b, with the hub of this compound gear being mounted upon ball bearing 123 that is in turn mounted upon shaft 90. A bevel gear 117 may also be a part of this compound gear or may be merely secured thereto, so as to rotate therewith. Meshing with bevel gear 117 is an idler gear 118 that is rotatably mounted upon a short extension 121 secured upon shaft 90. Bevel gear 119 is in mesh with idler gear 118 so as to be turned thereby, which means that it is driven in the opposite rotative direction to gear 117. As will be noted from FIGURE 5, bevel gear 119 is rotatably mounted upon the outer race of ball bearing 124, the inner race of which is secured to shaft 90. Gear 119 causes the rotation of gear 187a either by virtue of being a compound gear therewith, or by being secured thereto.

Because gears 87a and 187a are secured to rotate with bevel gears 117 and 119 respectively, gears 87a and 187a are at all times driven in opopsite directions. As will be noted from FIGURES 5 and 6, gear 87a meshes with gear 87, which is secured to shaft 86, rotatably mounted in bearings 125 and 126. In a similar manner described with regard to shaft 26 in FIGURE 1, shaft 86 is utilized for driving in rotation a middle race of the bearing arrangement 73. More particularly, gear 88 mounted upon shaft 86 is in mesh with gear 88a secured to middle race 74a, so as to cause this middle race to oscillate first in one direction and then in the other.

The oscillation of middle race 74b in the opposite direction to middle race 74a is accomplished by shaft 186, as seen in FIGURES 5 and 6. Gear 187 is secured to shaft 186, and inasmuch as gear 187 is enmeshed with 187a, previously described, shaft 186 is caused by the differential arrangement to rotate in the opposite rotative direction from shaft 86. Gear 188 is secured to shaft 186 and by virtue of this gear being enmeshed with gear 188a associated with middle race 74b, its rotation in the opposite direction to the middle race of the other half 74a of bearing arrangement 73 is accomplished. It should be noted that this form of dither is very precise and sinusoidal in form so as to effectively reduce the friction in the bearing supporting the inertial mass 71 to an extremely low value.

Middle race servo motor 75 is utilized for driving the middle race of the bearing arrangement 73 in the direction opposite to roll of the missile, with the aforementioned dither, of course, being superimposed upon this motion. Motor 75 is secured upon motor mounting plate 95 and is enmeshed with and arranged to drive a gear 89 that is secured upon shaft 90. Therefore, depending upon the direction and speed and rotation of motor 75, the gear 89 and hence the shaft 90 are driven in rotation. Extension 121 mounted upon shaft 90 of course rotates with shaft 90, and it in turn causes idler bevel gear to rotate around and around shaft 90. Since the idler bevel gear in such instances is not necessarily rotating on its own axis, it causes bevel gears 117 and 119 to be driven in essentially the same direction which causes, through shafts 86 and 136, the rotation of the middle races of the bearing arrangement 73 in the same rotative direction to cause the middle races of the bearings to track the inner races thereof. As earlier mentioned, the aforementioned dither in opposite directions is superimposed upon this rotation of the middle races in the same direction so that the inertial mass is not only in effect oblivious to missile roll (because of the middle races of the bearings being driven in the opposite direction to the roll of the missile so as to negate the effect of the rotation of the outermost races of the bearings) but also the opposite dither of these middle races prevents any errors due to bearing friction being introduced into the position of the inertial mass in space.

As will be noted in FIGURE 5, and in greater detail in FIGURE 7, an optical arrangement is employed in the control of the servo motor 75, this arrangement comprising a source of light 78 arranged to be directed through middle race polarizer disc 76 and inertial mass polarizer disc 77, with the light passing through these discs being manifested on photodetector 79.

The servo system employed with this embodiment is a proportional servo instead of a "bang bang" arrangement such as was employed in conjunction with embodiment of FIGURE 1, and inasmuch as this type of servo requires a higher gain, it requires more stages of amplification than are shown on FIGURE 3. Referring to FIGURE 9, the incident light causes a current I to be generated by photodetector 79, which may be a silicon photovoltaic cell. This current, which is proportional to the incident light impinging on the surface of 79 is presented to the low impedance emitter circuit of transistor 131, which is a common base transistor amplifier. A portion of this current equal to $\alpha I$ (where $\alpha$ is the common base D.C. current gain of 131) flows through the collector circuit of 131 and thence through the parallel combination of resistor 132 and the input impedance of 133 (a common collector transistor amplifier) to the positive side of the power supply, which may be 28 v. D.C. This current, I causes a voltage drop across the parallel combination of 132 and the input impedance of 133, which is proportional to the current flowing through it. Since $\alpha$ is a constant and I varies directly as the incident light intensity on 79, then the voltage drop across the parallel combination of 132 and the input impedance of 133 is directly proportional to the intensity of the light impinging on 79. In addition, since $\alpha$ is essentially 1, the same current flows in the relatively high impedance collector circuit as in the relatively low impedance emitter circuit. Because of this, the common base transistor 131 affords a voltage gain approximately equal to its collector load impedance 131 (the parallel combination of 132 and the input impedance of 133) divided by the emitter input impedance of 131. The diode 134 and the resistor 135 form a low impedance source of bias for the base of transistor 131 since after a certain minimum current, the forward voltage drop across a diode is essentially independent of the current through the diode. The resistor 135 supplies the current from the positive power supply to bias the diode 134 into this low impedance region. The portion of the current I which enters the base of common collector transistor amplifier 133 is multiplied by the factor $B+1$ (where B is the common collector current gain of 132) and flows through the emitter circuit of 133 (which includes resistor 136) to the positive power supply. This causes a voltage drop across 136 which is proportional to $(\alpha I)(B+1)$ and hence proportional to the intensity of the incident light on 79.

The purpose of the common collector amplifier 133 is to reduce the impedance level of the signal appearing in the collector circuit of 131. The position bias amplifier transistor 137 operates in a manner similar to that of 133. It receives input current flow from the voltage divider consisting of resistor 138 and variable resistor 139 in its base circuit. This current is multiplied by the factor $B+1$ (where B is the common collector current gain of 137) and appears in its emitter circuit where it flows through resistor 140 to the positive power supply. This current causes a voltage drop across 140 which is proportional to the magnitude of the current. The voltage drop across 140 is adjusted by adjusting variable resistor 139 until it is equal in magnitude to the voltage drop across 136 due to a 45° difference in the angle between the respective axes of polarization of the polarizers fixed to the middle and inner races of the three race bearings. Since the output of the D.C. preamplifier is taken as the difference in voltage drops across 136 and 140, the output will be equal to zero volts where the axes of polarization of the two polarizers one at an angle of 45° with respect to each other.

D.C. power is supplied to the preamplifier by the voltage regulator consisting of 141, 142 and 143. When 142 and 143 are biased past the point of breakdown in the reverse direction, the voltage drop across them varies very little with changing current through them. This insures that changes in voltage in the 28 volt power supply will cause very little change in the voltage across 142 and 143 and will appear as a change in the voltage drop across 141 instead. Power supply voltage for the preamplifier is taken across the diodes 142 and 143 and hence remains constant for variations in the 28 volt power supply.

Referring to FIGURE 10, the shaping network—consisting of capacitor 144 and resistors 145 and 146—serves the purpose of compensating for the high frequency phase shift and attenuation introduced into the system by the combination of the motor characteristics and the mechanical load inertia. This compensation is accomplished by introducing an R-C lead-lag network into the servo forward loop. If the time constant of this lead controlled by 145 and 144, exactly equals the time constant of the motor and inertia lag, the effect of the lag is cancelled. The accompanying lag, controlled by capacitor 144 and resistor 146 is made to have a time constant so short as to place it above the highest frequency of interest. The operation and application of this network is treated fully in chapters 6 and 16 of the book Feedback Control Systems, by R. Bruns and R. Saunders.

The function of the modulator portion of this circuit is to impress the D.C. error signal upon a 400 c.p.s. A.C. carrier in the form of suppressed carrier modulation. In this application, the light sensitive resistances 147 and 148 act as synchronous switches controlled by the gas discharge lamp 149 which flashes at the carrier frequency. The action of this circuit is to convert the D.C. error signal into an A.C. error signal whose phase is determined by the polarity of the D.C. signal and whose magnitude is proportional to the magnitude of the D.C. signal. The operation of this modulator is described in chapter 16 of the book Handbook of Semiconductor Electronics, edited by Lloyd P. Hunter.

The A.C. preamplifier portion of the circuit operates in this manner: The input signal is fed to the base of transistor 151 through transformer 152 which serves the dual purpose of isolating the D.C. grounds in the modulator and preamplifier circuits and eliminating the shunting effect of the base bias circuit consisting of resistors 153 and 154, on the input impedance of the preamplifier. The input signal appearing at the base of 151 is amplified and appears in the collector circuit across resistor 155 and the base input impedance of transistor 156. The signal is further amplified and appears across resistors 157 and 158 in series shunted by potentiometer 159. The portion of this signal which appears across resistor 158 is introduced into the emitter circuit of 151 as negative feedback. This causes the total gain of the preamplifier to be governed by the ratio of the resistors $$\frac{R_{157}+R_{158}}{R_{158}}$$

and prevents variations in parameters of the transistors from affecting this sign. The same feedback loop stabilizes the D.C. operating point of the amplifier. The forward voltage drop across diodes 160 and 161 provides emitter bias for transistor 156. Resistor 162 provides a constant bias current to flow through diodes 160 and 161 so that they will be biased into the low impedance portion of their forward voltage current characteristic. The divider network composed of resistors 153 and 154 supplies base bias for 151 and controls the D.C. operating point of the amplifier. The output signal appearing across resistors 157 and 158 is coupled into the potentiometer 159 through capacitor 163. The overall gain of the preamplifier is varied by adjusting the potentiometer 159.

Figure 11:
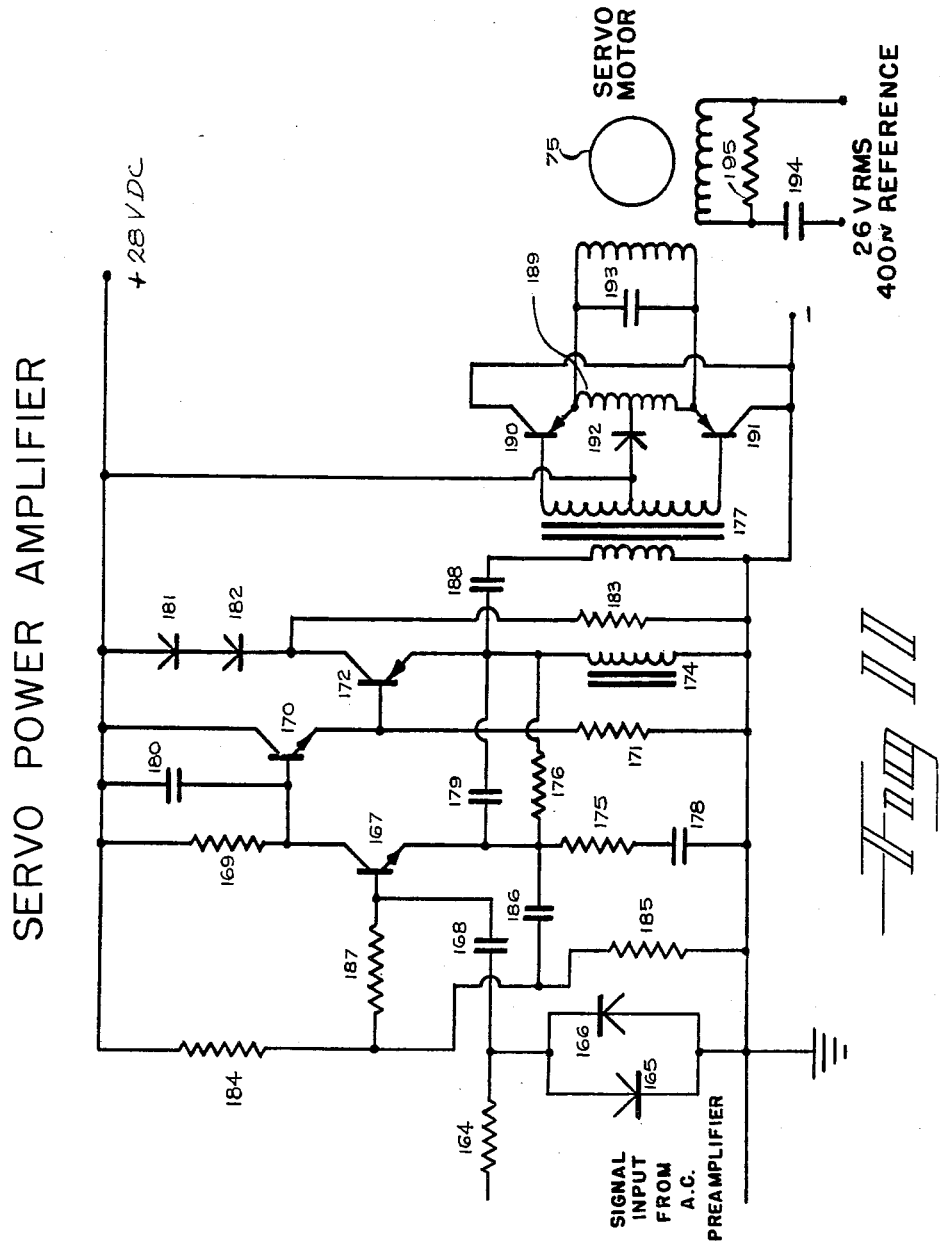
FIGURE 11 is a continuation of the circuit diagram of FIGURE 10, illustrating the servo power amplifier.

The operation of the servo power amplifier of FIGURE 11 may be described as follows:

The resistor 164 and the parallel inverted diodes 165 and 166 form a protective clipper network to limit the peak voltage of the input signal to the forward diode voltage of one of the diodes. The purpose of this network is to prevent damage to the amplifier input stage due to overloading. The input signal is coupled into the base circuit of common emitter stage 167 through capacitor 168. The input signal is amplified and appears in the collector circuit of transistor 167 across resistor 169 and the base input impedance of common collector stage 170. The signal appearing across the base input impedance of transistor 170 is reduced in impedance level and appears across resistor 171 and the base input impedance of common emitter stage 172, which is in the emitter circuit of transistor 170. The signal across the base input impedance of common emitter stage 172 is amplified and appears in the collector circuit of 172 across the lead consisting of inductor 174, resistors 175 and 176, and the primary winding of transformer 177. The portion of this signal appearing across resistor 175 is injected into the emitter circuit of 167 as negative feedback. The gain of this portion of the amplifier (consisting of transistors 167, 170, 172 and their associated components) is controlled by the ratio of resistors $$\frac{R_{175}+R_{176}}{R_{175}}$$

and is essentially independent of the variations of the parameters of transistors 167, 170 and 172. The same feedback path serves to stabilize the D.C. operating point of this portion of the amplifier with the exception that the feedback voltage divider is blocked from ground for D.C. by the capacitor 178. This causes the full D.C. output voltage to appear in the emitter circuit of 167 as negative feedback and sets the D.C. gain of the amplifier at essentially unity. This affords very good control of the D.C. operating point with temperature. Capacitors 179 and 180 control the high frequency phase angle of the amplifier to prevent oscillation. Diodes 181 and 182 in conjunction with resistor 183 provides a low impedance source of emitter bias for common emitter stage 172. This bias is necessary to provide emitter to collector voltage for 170 sufficient to prevent its operation in the saturation region of its characteristics. The resistance voltage divider consisting of resistors 184 and 185 serves to provide D.C. bias for the base of 167 and in this way establishes the D.C. operating point of the amplifier. The shunting effect of resistors 184 and 185 on the input impedance of the amplifier is eliminated by capacitor 186 and resistor 187. Capacitor 186 couples the A.C. voltage present at the emitter of 167 to the top of the voltage divider 184 and 185. This voltage is approximately equal to $$\frac{B}{1+B}$$

times the input voltage at the base of 167 (where B is the grounded emitter current gain of 167). In this case the voltage across the resistor 187 is equal to the input voltage times $$\frac{1}{B+1}$$

or, to state it differently, the equivalent resistance of resistor 187 is equal to $R_{187}(B+1)$. Since B is very large, the equivalent resistance $R_{187}(B+1)$ is very large and this eliminates the shunting effect of the bias circuitry on the input impedance of the amplifier. Capacitor 188 is an A.C. coupling capacitor to couple the output of transistor 172 to the primary of 177. Transformer 177, inductor 189, transistors 190 and 191, and diode 192 comprise a class B, common collector power amplifier. Diode 192 provides a D.C. bias to effect the change in the base to emitter diode voltage of transistors 190 and 191 with temperature and prevent thermal runaway of the power amplifier. Inductor 189 serves to couple the outputs of 190 and 191 to the servo motor 75. Capacitor 193 serves to tune the impedance of the control winding of servo motor 75 to unity power factor. The operation of the common collector, class B power amplifier is treated in full in Section 11 of the book Handbook of Semiconductor Electronics, edited by Lloyd P. Hunter.

The network composed of capacitor 194, resistor 195, and the impedance of the fixed phase winding of the servo motor serves to provide the fixed phase of the servo motor with the correct voltage of 400 cycle power at a phase angle of 90° with the 400 cycle reference. A complete discussion of this technique is found in chapter 4 of the book Radiotron Designers Handbook, edited by F. Langford-Smith.

The positional readout information for the embodiment according to FIGURE 5 is obtained by the use of certain portions of the photodetector arrangement of FIGURES 7 and 8, which were previously described with respect to details associated with the drive arrangement of servo motor 75.

Referring to FIGURE 7, the light source 80 directs a beam of light through inertial mass light-polarized disc 77, which light then impinges upon detector 83, which is supported in holder 201. Detector unit 83 is disposed between the light-polarized discs 76 and 77 inasmuch as positional readout involves only inertial mass light-polarized disc 77, and accordingly, the light from illumination source 80 does not need to be directed through both discs. As the degree of illumination sensed by detector unit 83 is caused to change as a result of the rotation of the disc 77, the resistance of the detector is caused to change, with this change being monitored so as to provide an indication of the angular position of the housing with respect to the inertial mass.

Preferably a differential arrangement is employed for the photodetector arrangement. Referring to FIGURE 8, it will be seen in this exploded view that the detector unit 83 comprises a pair of light-polarized elements 202 and 203 that are disposed with their axes of polarization located at right angles. These elements are secured to and supported by a U-shaped spacer and mounting device 204. Light passing through the polarizers falls upon a pair of photocells 205 and 206, which may be silicon photovoltaic cells such as are manufactured by Hoffman Electronics Corporation of Los Angeles, California. It is to be understood that the silicon photovoltaic cells 205 and 206 receive a position signal in the form of light which is proportional to the $\cos^2$ of the angular difference between the axis of polarization of the movable polarizer 77 attached to the inertial mass, and the respective fixed polarizers 202 and 203. Since the axes of polarization of polarizers 202 and 203 are mutually perpendicular, the light falling on one cell is proportional to a $\cos^2$ function and the light falling on the other cell is proportional to a $\cos^2$ function displaced in phase by 90°.

Figure 12:
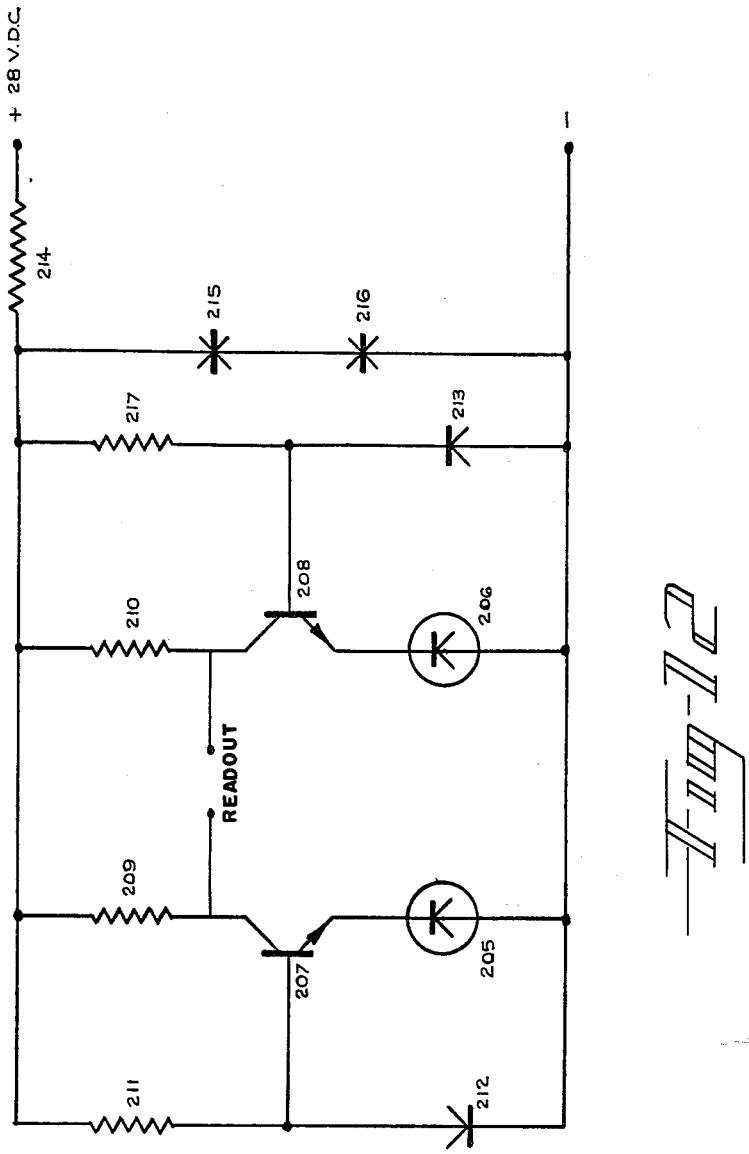
FIGURE 12 is a circuit diagram of a position readout amplifier to be utilized in the reading out of information such as roll, pitch or yaw information of a missile.

Referring to FIGURE 12, it will be seen that cells 205 and 206 of the position readout amplifier supply currents to the inputs of the respective common base transistor amplifiers 207 and 208, which are proportional to the incident light intensity on each cell. The outputs of these amplifiers are subtracted in the differential connection between the collectors of the transistors. Since, as previously mentioned, the two signals are proportional to the $\cos^2$ of the angles between the axes of polarization and are displaced 90° with respect to each other, the resultant difference is proportional to the cosine of twice the angle between the axes of polarization.

The operation of the two common base amplifier transistors 207 and 208 is the same as that of common base amplifier transistor 131 in the D.C. preamplifier of FIGURE 9. The resistors 209 and 210 comprise the collector loads for transistors 207 and 208 respectively. Resistors 211 and 217 are employed to bias diodes 212 and 213 into the low impedance portion of their voltage-current characteristics and thus supply transistors 207 and 208 with low impedance sources of bias. Photovoltaic cells 205 and 206 supply the emitter circuits of transistors 207 and 208 with current proportional to their incident light intensity. The output from the position readout amplifier is taken as the difference in the voltage drops across resistors 209 and 210 which is proportional to the difference in the currents generated by photovoltaic cells 205 and 206 and hence is proportional to the difference in the incident light on 205 and 206. The purpose of the zener diode voltage regulator comprised of resistor 214 and diodes 215 and 216 is to supply a stable, noise free source of D.C. voltage to the position readout amplifier. The operation of this voltage regulator is the same as that described for the voltage regulator of FIGURE 9 comprised of resistor 141 and diodes 142 and 143.

Different types of missile applications will require different readout arrangements. For example, a synchro or potentiometer readout can be employed as a function of control system with which it is operating with the changes and angles sensed by such an arrangement causing signals to be sent to the control system that is responsible for positioning the control surfaces in order for the missile to fly a desired course.

According to the present arrangement if a non-gyro inertial reference device is to be employed for reading out roll information for example, an optical arrangement may be employed in which a coded, segmented disc is utilized for reading out angular positional information in a convenient form to be used for telemetry purposes. This is because digital information is easier to work with for such purposes.

Figure 13:
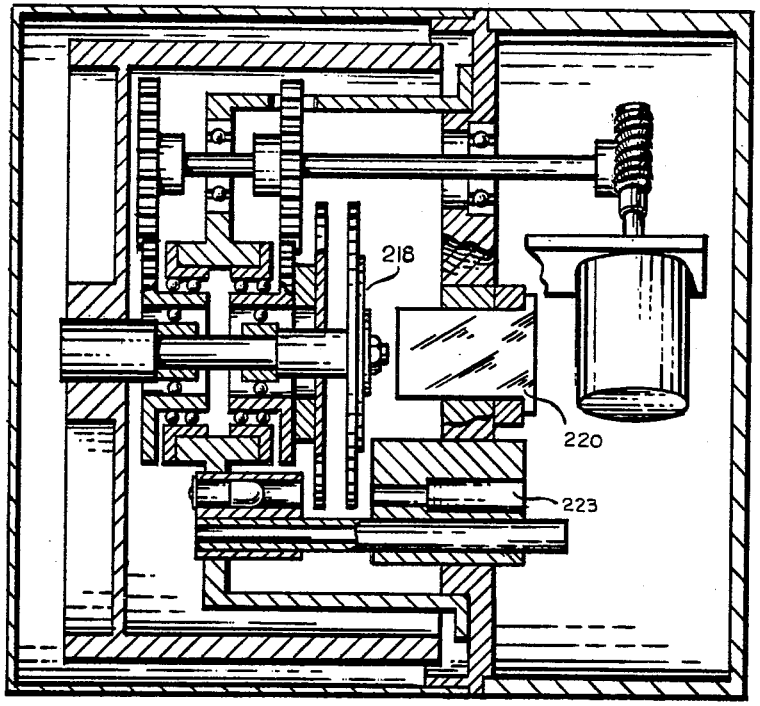
FIGURE 13 is a cross-sectional view, partly in section, of an embodiment according to this invention in which a particular type of optical readout arrangement is employed.
Figure 14:
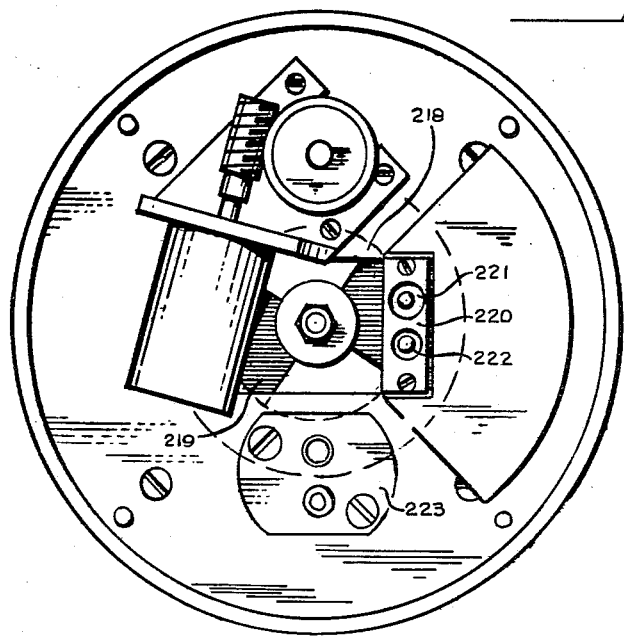
FIGURE 14 is an end view of FIGURE 13.

Referring to FIGURES 13 and 14, an embodiment of this invention much like that of FIGURE 1 is illustrated, in which a "bang-bang" servo arrangement is employed for driving the middle races of a tree race bearing arrangement in an in-phase relation. As in FIGURE 1, light emanating from a source of illumination is manifested through a pair of light-polarized discs and falls upon a light-sensitive detector arrangement contained in holder 223. As an alternative detector arrangement, radioactive beta emanations from a radioactive source may be used in lieu of a light bulb, and the detector may be a selenide or sulfide detector.

The embodiment shown in FIGURES 13 and 14 differs from the FIGURE 1 embodiment in that it employs a coded, segmented disc 218 for reading out the output information. This arrangement is primarily utilized where the angular information is unidirectional and the digital output information can be processed directly in a computer or in telemetry equipment to provide angular displacements as a function of a series of pulses. Accordingly, disc 218 is typically mounted adjacent the inertial mass light-polarized disc, to be rotatable therewith in the manner illustrated in FIGURE 13. The detector arrangement 220 is disposed adjacent the periphery of the coded, segmented disc, preferential somewhat off the centerline of the housing as best seen in FIGURE 14.

Disc 218 may be coded in a number of different ways, such as by having alternative reflecting and non-reflecting surfaces, or by constructing it to have serrations about its periphery so as to let light or other information through to a detector only when notched portions of the disc are presented. As seen in FIGURE 14, we preferably employ a coded, segmented disc 218 having alternate 90° segments 219 of a non-reflecting material. Light from source 221 is reflected from the disc and detected by detector 222 when the light-reflecting quadrants of the disc are directly below the light and the detector, but when the disc has been rotated to the position shown in FIGURE 14 in which a dark portion 219 is below the light and detector, the detector does not receive illumination from light 221. As should be apparent, by virtue of this arrangement the detector 222 receives a series of pulses, with the number of such pulses indicating the angle through which the missile has turned. In this embodiment, one of the 90° segments can represent the up direction, with the photodetector therefore sensing an essentially square wave output with the positive pulses indicating the alternate directions of up and down. The negative peaks of the square wave output represent an alternate left-right indication of direction. Therefore if a particular positive pulse represents the up direction, this positive pulse will represent up through the flight of the missile.

As above described, the present non-gyroscopic inertial reference arrangement is particularly well-suited for use in instances in which a reference mass is to be supported in a space stable manner without the use of the complex mounting arrangements necessitated by the use of gyroscopes. By virtues of the tracking arrangements described for the antifriction support of the mass, the mass can be isolated from rotation occurring about a particular axis of rotation of the missile, and can serve as an effective directional reference for the missile guidance arrangement.

The oscillation or dithering superimposed upon this tracking quite effectively eliminates the torque inputs to the mass that would otherwise occur due to the presence of static friction and other forms of coulomb friction. As should be obvious, this oscillation may be supplied from the same servo arrangement that supplied the tracking, or may be supplied from a separate servo arrangement. The latter type of oscillation arrangement would typically be employed if the bearing arrangement comprises a pair of spaced three race bearings, the middle races of which are to be driven in opposite phase rotation to further minimize coulomb friction.

As should be obvious, the present invention is not to be limited to the precise embodiments shown and described herein. For example, the embodiment according to FIGURE 5 may be arranged to employ other arrangements than two motors for providing tracking and oscillation, and correspondingly, the embodiment according to FIGURE 1 can be arranged to employ an opposite-phase dithering of the middle races of the bearings.

The light-polarized discs, which otherwise are referred to as polarizers, are preferably of Polaroid material although it is to be understood that this invention is not to be limited thereto. For example, prismatic discs may be substituted, which may be in the nature of Nicol prisms in order to achieve the desired light-polarizing arrangement.

We claim:

1. A non-gyroscopic inertial reference arrangement for a missile or the like comprising a housing, a mass rotatably supported in said housing in a three race bearing arrangement which includes a pair of three race bearings disposed in spaced relationship on opposite sides of said mass so as to stably support same, servo means for minimizing the friction present in said bearing arrangement, said servo means including means for oscillating the middle races of each of said bearings simultaneously in opposite rotative directions, thereby to minimize coulomb friction, said servo means also including a first light-polarized disc mounted to rotate with said inertial mass and a second light-polarized disc connected to rotate with said middle race, illuminating means for directing light through said discs, with the amount of light manifesting through said discs being determined by the relative rotative positions thereof, photosensitive means for receiving the light passing through said light-polarized discs from said illuminating means, the resistance of said photosensitive means varying in proportion to the intensity of said light, and control means incorporating said photosensitive means, for actuating said drive means to bring about rotation of said middle race in the opposite direction to rotation of the missile about its axis, so as in effect to isolate from such rotation the race of the bearing directly concerned with the support of the inertial mass, whereby said inertial reference mass is supported in an arrangement having a minimum of torsional restraints.

2. A non-gyroscopic inertial reference arrangement for a missile or the like comprising a housing, a mass rotatably supported in a three race bearing arrangement in said housing so as to be space stable, servo means for minimizing the friction present in said bearing arrangement, said servo means including means for driving the middle race in rotation, said servo means also including a first light-polarized disc mounted to rotate with said inertial mass and a second light-polarized disc connected to rotate with said middle race, illuminating means for directing light through said discs, with the amount of light manifesting through said discs being determined by the relative rotative positions thereof, photosensitive means for receiving the light passing through said light-polarized discs from said illuminating means, the resistance of said photosensitive means varying in proportion to the intensity of said light, control means incorporating said photosensitive means, for actuating said drive means to bring about rotation of said middle race in the opposite direction to rotation of the missile about its axis, so as in effect to isolate from such rotation the race of the bearing directly concerned with the support of the inertial mass, said servo means also including means for superimposing oscillatory motion upon said middle race to minimize the effect of coulomb friction, said means for driving including separate motors for driving said middle races in oscillation and in a net rotative direction to compensate for missile rotation, whereby said inertial reference mass is supported in an arrangement having a minimum of torsional restraints.

3. A non-gyroscopic inertial reference arrangement for a missile or the like comprising a housing, an inertial mass rotatably supported in a pair of three race bearings in said housing so as to be space stable, servo means for minimizing the friction present in said bearing arrangement, said servo means including means for driving the middle races of said bearings in rotation, said servo means also including a first light-polarized disc mounted to rotate with said inertial mass, a second light-polarized disc connected to rotate in accordance with apparent rotation of said first disc as said first disc, along with said inertial mass, strives to achieve stability in space, illuminating means for directing light through said discs, with the amount of light manifesting therethrough being determined by the relative rotational positions thereof, photosensitive means for receiving the light passing through said polarized discs from said illuminating means, the resistance of said photosensitive means varying in proportion to the intensity of said light, control means incorporating said photosensitive means, for actuating said drive means to cause rotation of said middle races to bring about tracking by said middle races of the bearing races which are directly concerned with supporting said inertial mass, means for superimposing oscillatory motion upon said middle races so as to minimize the effect of coulomb friction, said oscillatory motion being brought about by said servo means including said second disc, said servo means being constructed to constantly seek a reference bias position, thus being in continuous oscillation, whereby said inertial reference mass is supported in an arrangement having a minimum of torsional restraints, and means for providing readout of the inertial reference information.

4. A non-gyroscopic inertial reference arrangement for a missile or the like comprising a housing, an inertial mass rotatably supported in a pair of three race bearings in said housing so as to be space stable, servo means for minimizing the friction present in said bearing arrangement, said servo means including means for driving the middle races of said bearings in rotation, said servo means also including a first light-polarized disc mounted to rotate with said inertial mass, a second light-polarized disc connected to rotate in accordance with apparent rotation of said first disc as said first disc, along with said inertial mass, strives to achieve stability in space, illuminating means for directing light through said discs, with the amount of light manifesting therethrough being determined by the relative rotational positions thereof, photosensitive means for receiving the light passing through said polarized discs from said illuminating means, the resistance of said photosensitive means varying in proportion to the intensity of said light, control means incorporating said photosensitive means, for actuating said drive means to cause rotation of said middle races to bring about tracking by said middle races of the bearing races which are directly concerned with supporting said inertial mass, means for superimposing oscillatory motion upon said middle races so as to minimize the effect of coulomb friction whereby said inertial reference mass is supported in an arrangement having a minimum of torsional restraints, and means for providing readout of the inertial reference information, latter means including a commutator driven in accordance with the rotation of said middle race, thereby becoming a space stable reference.

5. A non-gyroscopic inertial reference arrangement for a missile or the like comprising a housing, an inertial mass rotatably supported in a pair of three race bearings in said housing so as to be space stable, servo means for minimizing the friction present in said bearing arrangement, said servo means including means for driving the middle races of said bearings in rotation, said servo means also including a first light-polarized disc mounted to rotate with said inertial mass, a second light-polarized disc connected to rotate in accordance with apparent rotation of said first disc as said first disc, along with said inertial mass, strives to achieve stability in space, illuminating means for directing light through said discs, with the amount of light manifesting therethrough being determined by the relative rotational positions thereof, photosensitive means for receiving the light passing through said polarized discs from said illuminating means, the resistance of said photosensitive means varying in proportion to the intensity of said light, control means incorporating said photosensitive means, for actuating said drive means to cause rotation of said middle races to bring about tracking by said middle races of the bearing races which are directly concerned with supporting said inertial mass, means for superimposing oscillatory motion upon said middle races so as to minimize the effect of coulomb friction whereby said inertial reference mass is supported in an arrangement having a minimum of torsional restraints, and means for providing readout of the inertial reference information, latter means comprising a photosensitive arrangement associated with a light-polarized disc that is directly rotatable with said middle race, said photosensitive arrangement including a differential arrangement of photodetectors.

6. A non-gyroscopic inertial reference arrangement for a missile or the like comprising a housing, an inertial mass rotatably supported in a pair of three race bearings in said housing so as to be space stable, servo means for minimizing the friction present in said bearing arrangement, said servo means including means for driving the middle races of said bearings in rotation, said servo means also including a first light-polarized disc mounted to rotate with said inertial mass, a second light-polarized disc connected to rotate in accordance with apparent rotation of said first disc as said first disc, along with said inertial mass, strives to achieve stability in space, illuminating means for directing light through said discs, with the amount of light manifesting therethrough being determined by the relative rotational positions thereof, photosensitive means for receiving the light passing through said polarized discs from said illuminating means, the resistance of said photosensitive means varying in proportion to the intensity of said light, control means incorporating said photosensitive means, for actuating said drive means to cause rotation of said middle races to bring about tracking by said middle races of the bearing races which are directly concerned with supporting said inertial mass, means for superimposing oscillatory motion upon said middle races so as to minimize the effect of coulomb friction whereby said inertial reference mass is supported in an arrangement having a minimum of torsional restraints, and means for providing readout of the inertial reference information, said readout arrangement utilizing a coded segmented disc rotatable with said shaft upon which said inertial mass is rotatably mounted.

7. An inertial reference arrangement comprising a housing, a mass rotatably supported in said housing in a three race bearing arrangement so as to be space stable, a first light-polarizer mounted to rotate with said mass, and a second light-polarizer serving as a reference, driving means for supplying motion to the middle race of said three race bearing arrangement, control means for controlling the operation of said driving means, illuminating means for directing light through said polarizers, the amount of light manifesting therethrough being determined by the relative positions thereof, photosensitive means for receiving the light passing through said polarizers, the resistance of said photosensitive means varying in proportion to the intensity of said light, said photosensitive means being disposed in said control means of said driving means, said driving means driving said middle race rotatively in accordance with the relative rotation occurring between said housing and said mass as sensed by said first polarizer, thereby to isolate from rotation of said housing the race of said bearing directly concerned with support of said mass, means for superimposing oscillatory motion upon said middle race to minimize the effect of coulomb friction, said driving means including a differential arranged to effectively combine the motion resulting from the driving of said middle race rotatively, and the motion due to said oscillation, said differential being connected to the middle races of said pair of bearings, for driving said middle races in a net rotative direction in response to movement of said missile about its axis, while superimposing opposite phase oscillation upon said middle races.

8. A non-gyroscopic inertial reference arrangement for a missile or the like comprising a housing, an inertial mass rotatably mounted in said housing in a pair of three race bearings so as to be space stable, position-sensitive means in said housing for detecting relative motion occurring between said housing and said mass, driving means arranged to provide motion to the middle races of said bearings, said position-sensitive means transmitting indications of said relative motion to said driving means for said driving means to rotate said middle races in such a direction as to reduce bearing friction and to effectively isolate said mass from the effect of said relative rotation, and means for superimposing oscillation upon said rotation of said middle races so as to further reduce bearing friction, said means including an arrangement for rotating said middle races in opposite phase relation.

9. A light-responsive follow-up arrangement for an inertial mass device comprising first and second light-polarized discs mounted upon respective rotative shafts, said first disc and its shaft being mounted to move with the inertial mass, and said second disc and its shaft being arranged to closely follow said first disc, illuminating means for directing light through said discs with the amount of light manifesting therethrough being determined by the amount of error represented in the relative rotative positions of said discs, photosensitive means for receiving the light from said illuminating means passing through said discs, drive means for driving the shaft of said second disc, control means for said drive means, said control means incorporating said photosensitive means and arranged to actuate said drive means in response to changes in illumination manifesting through said discs to rotate said second disc in the direction to reduce the detected error, whereby said second disc can track said first disc without imposing torsional restraint thereon, said inertial mass being supported in antifriction means so as to be space stable, and said shaft of said second disc being arranged for driving a portion of said antifriction means so as to minimize friction therein, said illuminating means also including an additional source of illumination arranged to direct light only through said first disc, and a detector arrangement for sensing the amount of light emanating therethrough, said detector arrangement being incorporated in a device for furnishing a readout of the position of said inertial mass.

10. An inertial reference arrangement for a missile or the like comprising a housing, an inertial mass rotatably supported in a three race bearing arrangement in said housing so as to be space stable, servo means for minimizing the friction present in said bearing arrangement, said servo means including means for driving the middle race of said bearing arrangement in rotation, said servo means also including a first light-polarized disc mounted to rotate with said inertial mass and a second light-polarized disc connected to rotate with said middle race, illuminating means comprising a source of illumination for directing light through said discs, with the amount of light manifesting through said discs being determined by the amount of error represented in relative rotative positions thereof, photosensitive means for receiving the light passing through said light-polarized discs from said illuminating means, the resistance of said photosensitive means varying in proportion to the intensity of said light, control means incorporating said photosensitive means for actuating said drive means to bring about rotation of said middle race in the opposite direction to relative rotation of said housing and said mass, said drive means also causing the rotation of said second disc in the direction of rotation of said first disc so as to reduce the detected error, said drive means being a proportional servo motor controlled by said control means, thereby creating a servo loop that functions to minimize viscous friction in said three race bearing by virtue of the middle race tracking the race directly concerned with the control of said inertial mass, said illuminating means also including an additional source of illumination for directing light through said first disc, and said photosensitive means including a differential detector arrangement for sensing the amount of light emanating through said first disc and for providing a readout as to the position of said inertial mass.

11. The inertial reference arrangement as defined in claim 10 in which said illuminating means and said photosensitive means are disposed in a common unit in which said source of illumination and said additional source of illumination are at the opposite ends thereof, and said differential detector is disposed between said first and second discs and supported by a member common to said sources of illumination.

12. A non-gyroscopic inertial reference arrangement for a missile or the like comprising a housing, a mass rotatably supported in said housing in a three race bearing arrangement so as to be space stable, a first light-polarized disc mounted to rotate with said mass, driving means including a reversible servo motor for supplying rotary motion to the middle race of said three race bearing, a second light-polarized disc adjacent to said first disc and mounted to rotate with said middle race, illuminating means arranged to direct light through said discs, the amount of light manifesting through said discs being determined by the relative rotative positions thereof, photosensitive means for receiving the light passing through said discs from said illuminating means, the resistance of said photosensitive means varying in proportion to the intensity of said light, switching means designed to produce a first output when the resistance of said photosensitive means is above a first value, and a second output when the resistance of said photosensitive means is below a second value, said outputs of said switching means being connected to said servo motor for causing said motor to rotate in a first direction during said first output and in a second and opposite direction during said second output, the direction of rotation of said motor in each instance causing said second disc to rotate in the direction to bring about a change in light required to cause the output to said motor to be reversed, thereby causing said middle race to be rapidly oscillated, the point of rapid reversal about which said motor operates being determined by the rotative position of said first disc, whereby as a missile in which said housing is mounted tends to rotate about its axis, said rotation occurs with respect to said space stable mass, thereby causing said middle race to be driven in the opposite direction to the rotation of said missile to substantially reduce viscous friction.

References Cited in the file of this patent

UNITED STATES PATENTS

| | | |
|---|---|---|
| 1,600,071 | Shaifer | Sept. 14, 1926 |
| 2,167,484 | Berry | July 25, 1939 |
| 2,370,000 | Best | Feb. 20, 1945 |
| 2,565,213 | Falkenstein | Aug. 21, 1951 |
| 2,577,942 | Agins | Dec. 11, 1951 |
| 2,882,034 | Wuerth | Apr. 14, 1959 |
| 2,898,538 | Rafferty | Aug. 4, 1959 |
| 2,940,306 | Lozier | June 14, 1960 |
| 2,983,556 | Coan | May 9, 1961 |

FOREIGN PATENTS

| | | |
|---|---|---|
| 903,251 | France | Jan. 8, 1945 |